United States Patent

Rathus et al.

(10) Patent No.: US 8,510,337 B2
(45) Date of Patent: *Aug. 13, 2013

(54) SYSTEM AND METHOD FOR ACCESSING ELECTRONIC DATA VIA AN IMAGE SEARCH ENGINE

(75) Inventors: Spencer A. Rathus, New York, NY (US); Hanna Bondarik, Highland Park, NJ (US)

(73) Assignee: Olivo-Rathus Patent Group LLC, Marshall, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/237,849

(22) Filed: Sep. 20, 2011

(65) Prior Publication Data

US 2012/0011148 A1   Jan. 12, 2012

Related U.S. Application Data

(63) Continuation of application No. 12/799,532, filed on Apr. 27, 2010, now Pat. No. 8,024,359, which is a continuation of application No. 11/101,716, filed on Apr. 8, 2005, now Pat. No. 7,765,231.

(51) Int. Cl.
    *G06F 7/00* (2006.01)
(52) U.S. Cl.
    USPC ............ 707/783; 707/915; 709/206; 726/2; 382/115
(58) Field of Classification Search
    USPC ............... 707/999.006, 999.009, 999.104, 707/769, 783, 915; 709/206; 726/2; 382/100, 382/115
    See application file for complete search history.

(56) References Cited

U.S. PATENT DOCUMENTS

| | | | |
|---|---|---|---|
| 5,465,308 A * | 11/1995 | Hutcheson et al. | 382/159 |
| 5,813,009 A * | 9/1998 | Johnson et al. | 707/695 |
| 6,006,226 A | 12/1999 | Cullen | |
| 6,012,069 A | 1/2000 | Shibazaki | |
| 6,975,346 B2 | 12/2005 | Kumhyr | |
| 7,031,982 B2 | 4/2006 | Tanigawa | |
| 2002/0001393 A1 | 1/2002 | Jones | |
| 2003/0043920 A1 | 3/2003 | Akiyoshi | |
| 2003/0200217 A1 * | 10/2003 | Ackerman | 707/9 |
| 2004/0048605 A1 * | 3/2004 | Schaefer et al. | 455/414.2 |
| 2004/0236791 A1 | 11/2004 | Kinjo | |
| 2005/0041840 A1 | 2/2005 | Lo | |
| 2005/0185060 A1 | 8/2005 | Neven | |
| 2005/0207622 A1 * | 9/2005 | Haupt et al. | 382/118 |
| 2006/0012677 A1 | 1/2006 | Neven | |
| 2006/0050933 A1 | 3/2006 | Adam | |
| 2006/0240862 A1 | 10/2006 | Neven | |
| 2007/0159522 A1 | 7/2007 | Neven | |

* cited by examiner

*Primary Examiner* — Hosain Alam
*Assistant Examiner* — Jieying Tang
(74) *Attorney, Agent, or Firm* — Ward & Zinna, LLC

(57) ABSTRACT

The present invention provides a system and method for accessing electronic data through entry of images as queries in search engine. The system uses various image capturing devices and communication devices to capture images and enter them into image database. Image recognition techniques encode images in a computer readable format. The processed image is then entered for comparison into at least one database populated with images and associated information. Once the newly captured image is matched with an image in the database, the information linked with that image is returned to the user.

15 Claims, 15 Drawing Sheets

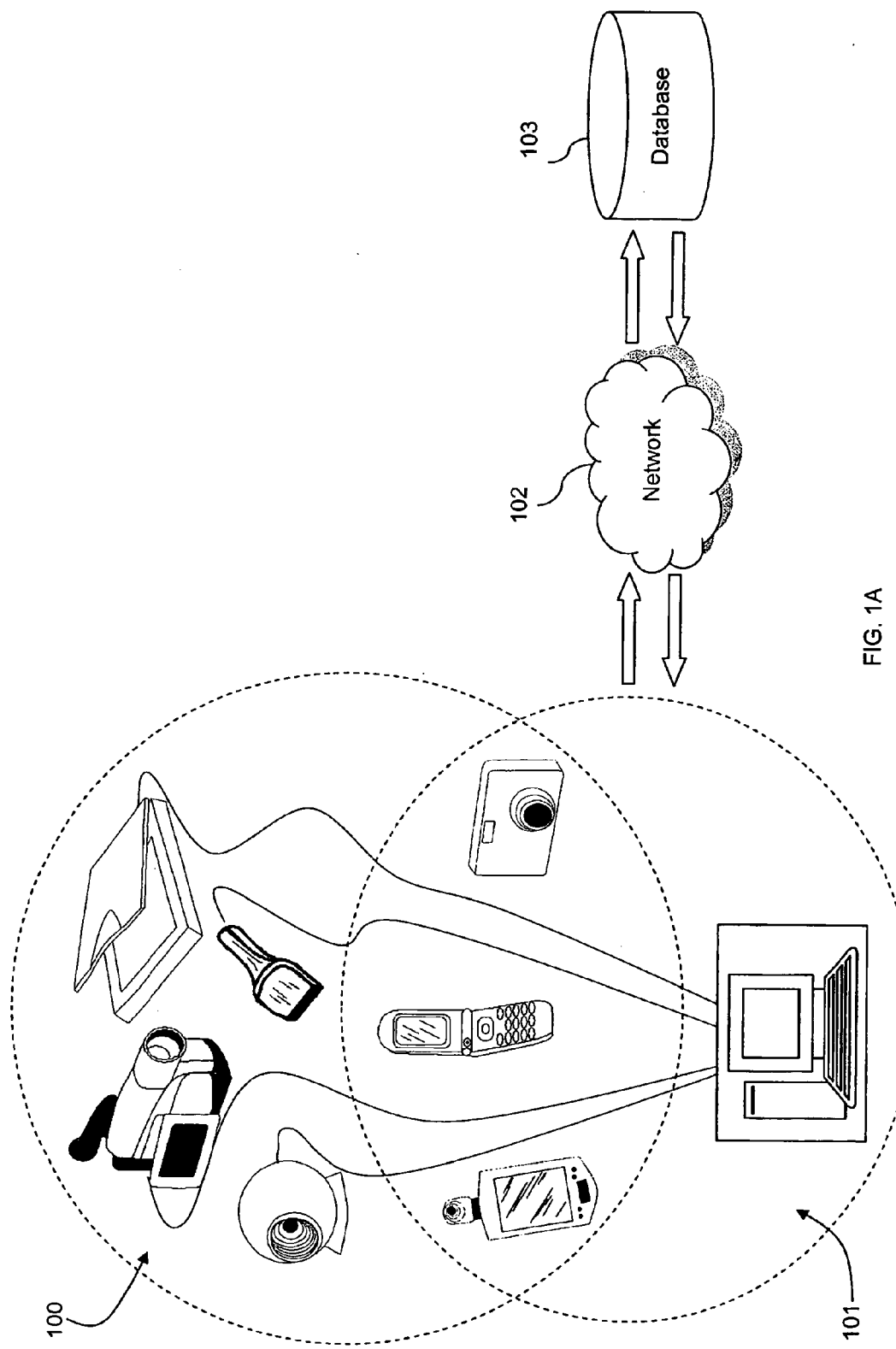

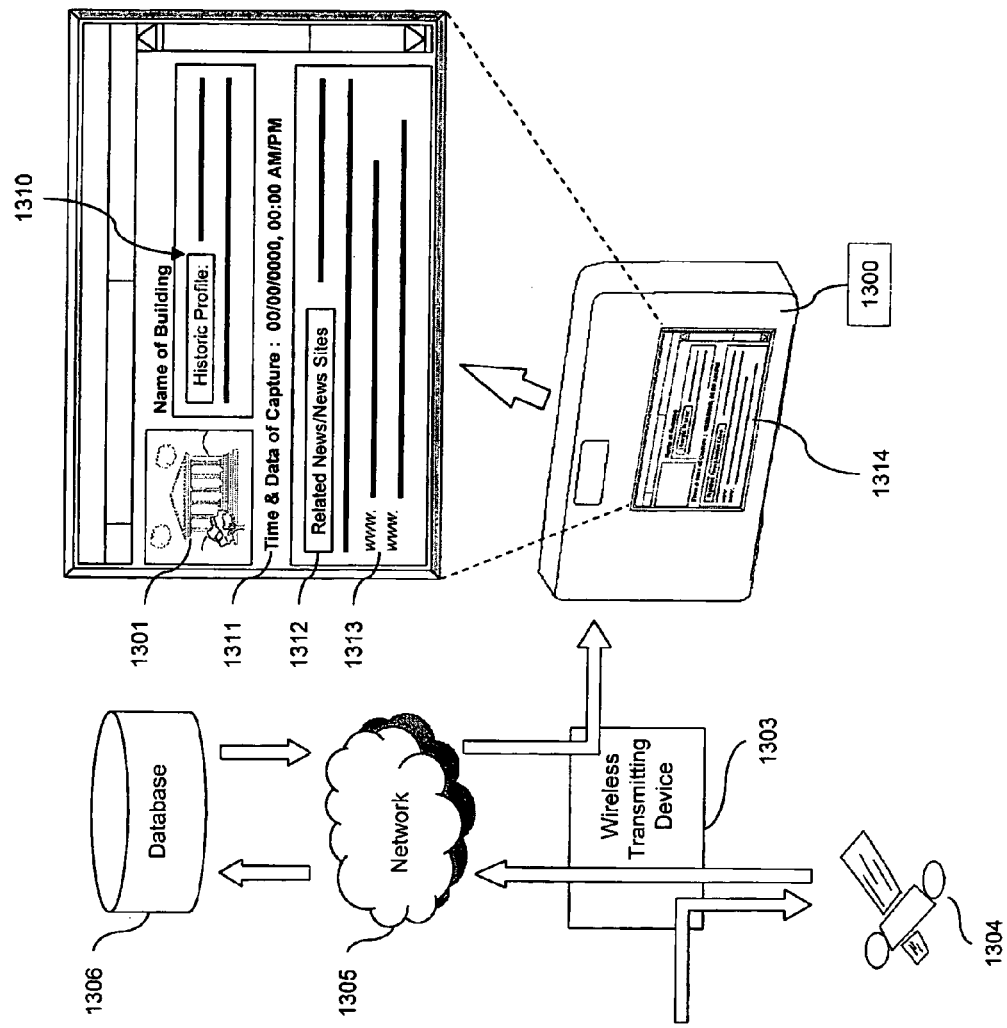
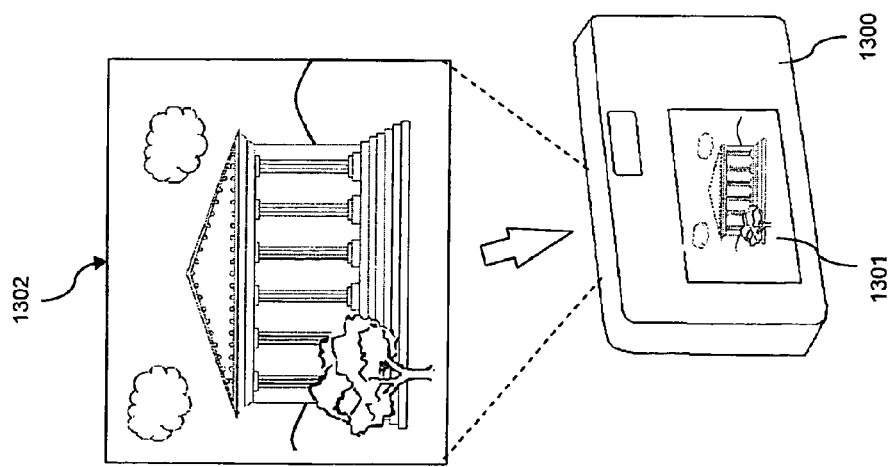
FIG. 13

SYSTEM AND METHOD FOR ACCESSING ELECTRONIC DATA VIA AN IMAGE SEARCH ENGINE

CROSS-REFERENCE TO RELATED APPLICATIONS

This is a continuation application of U.S. patent application Ser. No. 12/799,532, filed Apr. 27, 2010 now U.S. Pat. No. 8,024,359, which is a continuation application of U.S. patent application Ser. No. 11/101,716, filed Apr. 8, 2005 now U.S. Pat. No. 7,765,231, the entire contents of the entire chain of applications is herein incorporated by reference.

FIELD OF THE INVENTION

The invention relates to the field of accessing and retrieving electronic data. The system and method utilize an image acquisition device and a communication device to acquire and enter an image as a query in a database. Image recognition techniques then find related information in the database and return that information to the user.

BACKGROUND OF THE INVENTION

The Internet began as a simple database of limited textual information, and quickly transformed into an extensive database of images, text, and audio information. It would take several lifetimes to hunt for various kinds of information throughout the Internet and USENET news groups, and, all the while, the number of files would be expanding faster than anyone's ability to peruse them.

Search engines were devised to manage the hunt. Search engines are programs that search the Internet for documents that contain specified keywords and return a list of documents which contain those keywords. These engines run programs called "spiders" that continuously explore the Internet and, often, USENET news groups, they index the information on websites that the spiders encounter. Indexing forms a vast database of website addresses that are associated with key words that have been found on the websites themselves.

Search engines such as Yahoo, Google, MSN, and International Business Machines' CLEVER require the user to enter at least one key term or query into a text field. Keywords, phrases, phrases in quotes, and Boolean queries are matched to various sites on the Internet, and when the query is complete a list of these sites is displayed for the user's review.

Although the most widely used search engines have a category that enables them to access images, none of them allows an image to be entered as a query or search entity. All known engines require that the user enter a text query, and the search hits files that display images that are associated with the entered text query. If a person sees an image and wishes to access online information about it, he or she will have to search for it using a text query. The user cannot use the image itself as a query. If the user cannot put his or her search request into words, he or she will not be able to conduct a search in a standard online search engine.

Several innovators are working to solve this need. Hewlett-Packard, for example, has developed a method of indexing an image that is based on information derived from a global positioning system (GPS). The system obtains an image along with its location, and indexes images according to their location. Such systems are useful in organizing album data since some digital cameras can acquire GPS data and correlate it with captured imagery. However, searching is limited to images that have a significant correlation with a given location.

A search engine developed by Xerox Corporation incorporates a multi-modal browsing and clustering system to retrieve image data. The system seeks similarities between images not only in textual references, but also in other associated information such as in-links, out-links, image characteristics, text genre, and the like. However, this engine is limited to specific image types which have defined colors, contain text, and have other visual identifiers. In short, the Xerox engine requires the images to have such specific characteristics, it limits the system's utility and viability as an all purpose search engine.

Some attempts have been made to extract information from databases using images themselves as search entities rather than keywords related to the images. These systems can translate, provide information about, or interpret objects contained in an image. These systems generally work as follows. An input device extracts the object of interest from its background. The object is compared with objects stored in a prepopulated database to find a match. Finally, the system retrieves information in the database about the object and permits it to be displayed to the user. However, the system is limited to images containing extractable, defined objects, such as fruits, articles, animals, or any object which is easily outlined. However many images require identification as a whole entity, such as an image of a geographic locations or a piece of artwork. As a result, this method has limited applicability.

Complex images with a myriad of superfluous objects are easier to identify using methods such as pixel analysis. Using this method, a database is populated with primitive, weighted vectors of images that facilitate the image processing. The inputted images are compared and matched through specific vectors that define them. Therefore, there remains a clear need for a system capable of capturing images, converting those images into computer readable formats, using the processed images as search queries in a search engine, comparing the images to images stored in the database, and, upon finding a match, displaying information associated with the image to a user of the system.

SUMMARY OF THE INVENTION

The present invention allows a user to extract information about an object, organism, or scenario of interest by acquiring its image and inputting that image into a search engine. The search engine can recognize the image and extract related information in the form of electronic data. Using this system, user can extract information about virtually anything, ranging from profiles of people of interest to historic information about a monument, or information about a piece of artwork.

One object of the invention is the creation of a system which utilizes entry of an image as a search query or entity into a search engine.

Another object of the invention is the creation of a comprehensive registry of images, such as photographs, drawings, video clips, and holograms, which are associated with electronic data and serve as a universal image database that is available for matching images entered as search queries.

Another object of the invention is to provide the user of the system with the capacity to add information pertaining to an image to the database.

Another object of the invention is the creation of a system which utilizes pixel analysis as a means of comparing images entered as queries with images in the database in order to find a best-fit match.

A further object of the invention is the creation of a system which utilizes entry of an image along with alphanumeric characters to narrow the search. Boolean expressions (A AND, NOT, and OR B) can link images with text as a means of narrowing the search. Similarly, a plurality of images can be used in Boolean expressions.

A further object of the invention is the creation of a system which utilizes entry of geographical coordinates in addition to the image in order to narrow the search. These coordinates can be entered by means of GPS, triangulation of cellular telephone towers, or the like.

Yet a further object of the invention is the creation of a system which utilizes entry of time and date of image capture along with the image in order to narrow the search.

An additional object of the invention is the creation of a system which utilizes entry of video clips or an image with a spoken word using Voice Recognition Technology (VRT) or a conventional keyboard to further narrow the search.

Another object of the invention is the creation of a system which utilizes the use of Optical Character Recognition (OCR) technology to read and interpret text associated with captured images, such that the text is entered as a search term accompanied by such images to narrow the search.

Another object of the invention is the creation of a system which enables advertisers or marketers to preplan response to the entry of images of advertisements by providing images of said advertisements or the products seen within to those who update the search engine, and links to relevant products, services, discounts, and the like.

Other objects of the invention are obtaining more information about products and services and, if desired, purchasing or leasing them. This object is enabled by the user's capturing of an image of a product or part of a product, the entry of said image as a search query, and the provision of links to commercial Web sites by those who update the search engine.

Another object of the invention is the creation of a system to aid education. In this embodiment, the user captures an image and obtains information about the subject of the image from online educational sources such as books, encyclopedias, dictionaries, translators, and the like.

Another object of the invention is the creation of a system which enables the user to communicate with at least one person. In this embodiment, the user captures an image of a person of interest and obtains contact and other information posted online by or about the person of interest.

A further object of the invention is the creation of a system which can act as a travel guide, which gives the user the capacity to capture an image and obtain information such as location, translation, historic description, current news, nearby attractions, where to stay, where to eat, transportation, current currency exchange, and the like.

In accordance with one embodiment the present invention comprises a system for accessing electronic data by providing an image comprising: (i) a means for capturing an image, (ii) a means for transmitting said image to a database wherein the database comprises: a. a means to receive said image, b. a means to access electronic data associated with said image, and c. a means to transmit said data to a display unit.

In accordance with another embodiment the present invention comprises a method of extracting electronic data from a database by providing an image captured by capturing means comprising: (i) providing computer coded images stored on the database and further linked to electronic data, (ii) entering captured image, (iii) performing image recognition functions to computer code said captured image, (iv) matching said computer coded image to said computer coded images stored on the database, (v) linking said captured image to said matched linked electronic data, and (vi) presenting said electronic data on a display unit.

BRIEF DESCRIPTION OF THE DRAWINGS

A further understanding of the present invention can be obtained by reference to embodiments set forth in the illustrations of the accompanying drawings. Although the illustrated embodiments are merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

FIG. 1A depicts an illustration of the interaction of the major components of an image database, network, and transmission device in accordance with the present invention.

FIG. 13 depicts a use of the system of the present invention in the tourist context, wherein a tourist uses a GPS and web-enabled digital camera to capture an image and to acquire information about that image via the method of the present invention.

DETAILED DESCRIPTION OF THE INVENTION

Figure 1B:
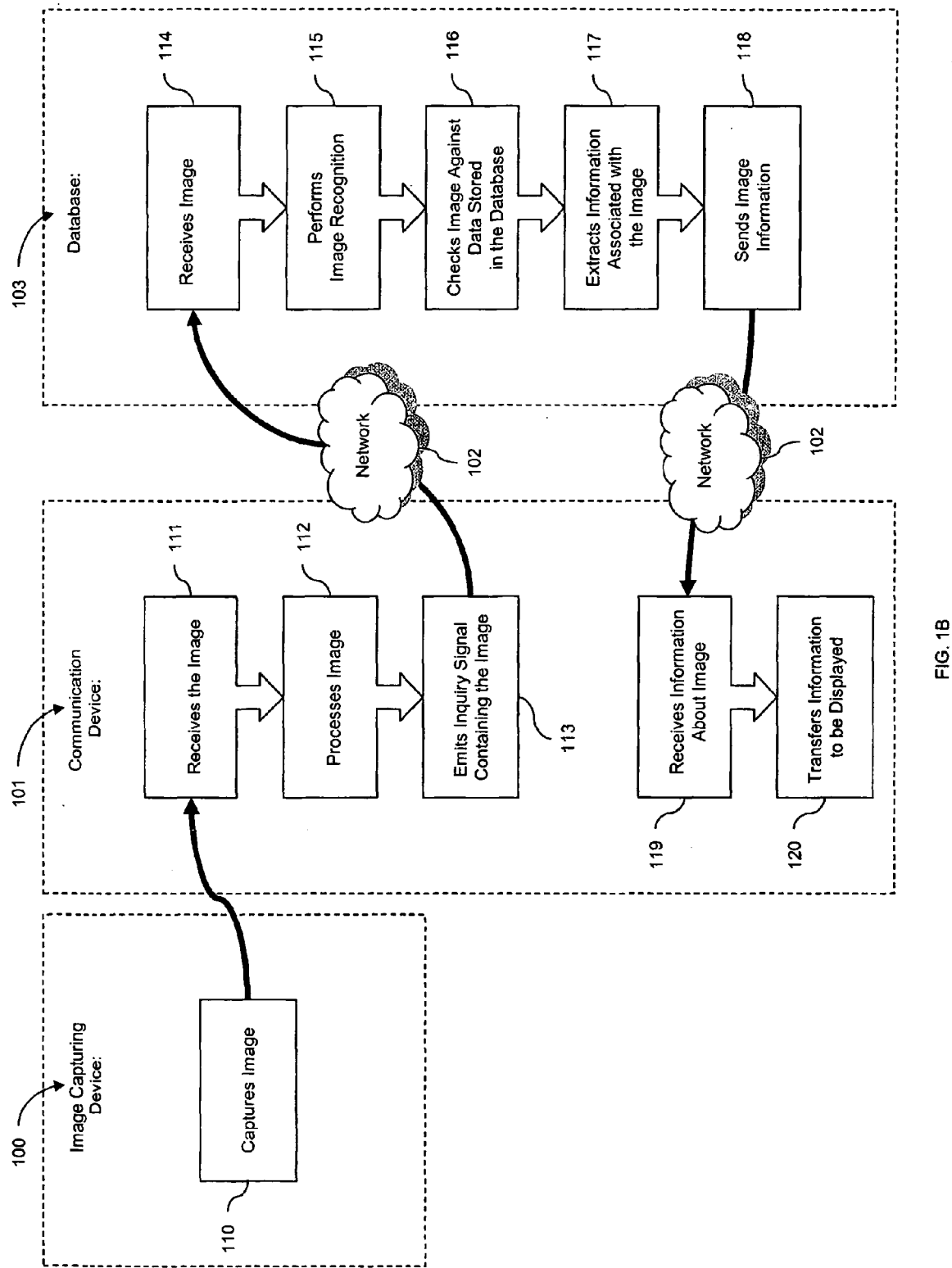
FIG. 1B depicts a flow diagram illustrating the methods and possible order of component interaction the components of FIG. 1A.

Detailed illustrative embodiments of the present invention are disclosed herein. However, techniques, systems and operating structures in accordance with the present invention may be embodied in a wide variety of forms and modes, some of which may be quite different form those in the disclosed embodiment. Consequently, the specific structural and functional details disclosed herein are merely representative, yet in that regard, they are deemed to afford the best embodiment for purposes of disclosure and to provide a basis for the claims herein that define the scope of the present invention. The following presents a detailed description of a preferred embodiment of the present invention.

The present invention provides a system capable of capturing images, entering the images into the search engine, extracting information associated with the images, and presenting the information to a user. Image capturing devices 100 capture the image and then transfer the image to communication devices 101 having transmitting and receiving means capable of communicating with database 103 through network 102, as shown in FIG. 1A. Wherein the transmitting and receiving means are any means capable of transmitting and receiving electronic signals. The images can be captured from a visual entity (object, people; animal, places, or anything capable of being captured by an image); entered from a printed material (photograph, book, magazine, poster, identification card, credit card, bank card, passport, advertisement, or any other printed media); copied from an electronic display unit (computer monitor, hand-held device screen, or any other similar device); captured from projected visual information (still image, film, video clip, streaming hologram, etc.), or any other means known for capturing images.

Network 102 can be of any type, including but not limited to a network that is wired, wireless, GSM, ISDN, Ethernet, CATV, Wi-Fi, LAN, Bluetooth, or the like. Likewise, the capturing apparatus can be any device capable of transferring a real-time visual entity into a digitalized image such as, but not limited to, digital/analog cameras, video cameras, scanners, hand-held scanners, camera-enabled cellular telephones, camera-enabled PDA's, or the like. The communication device can be any device or combination of devices having communication functions and displaying means such as, but not limited to, a hand-held device, cellular telephone, hybrid cellular telephone/PDA device, PDA, remote server, RFID device, Internet accessible camera, personal computer, laptop computer, pocket computer, hybrid electronic device, or the like. The image-capturing device can be connected to a communication device through a hard-wired data link, wireless data link, or any other type of connection. Many image-capturing devices and communication devices are integrated into one unit, or can be integrated into one unit, such that any communication device can have image capturing capabilities and vice versa. The combination of the plurality of image-capturing devices and the plurality of communication devices will be referred to as CI devices (Communicable-Imaging Devices) hereinafter due to the difficulties with making definite distinctions between these devices.

A possible method of component interaction and the associated processes are depicted in FIG. 1B wherein the image-capturing device 100 captures an image of an object, shown in process 110, which is received by the communication device 101, as shown in process 111. Communication device 101 processes the image, as shown in 112, by storing the image, converting the image to a desired data-type, and/or obtaining and indexing additional information about the image. Communication device 101 then transmits the image to the search engine's database 103 via a network 102 in process 113. After receiving the image in process 114, the processing means associated with database 103 performs image recognition functions of process 115 and compares the image with images stored within database 103 in process 116. After finding a match, database 103 extracts information associated with the image, as in process 117, and further transmits the information back to communication device 101 thru network 102, as shown in process 118. Communication device 101 receives the information, as shown in process 119, and displays the information on its display screen or an associated display device of process 120.

Figure 2A:
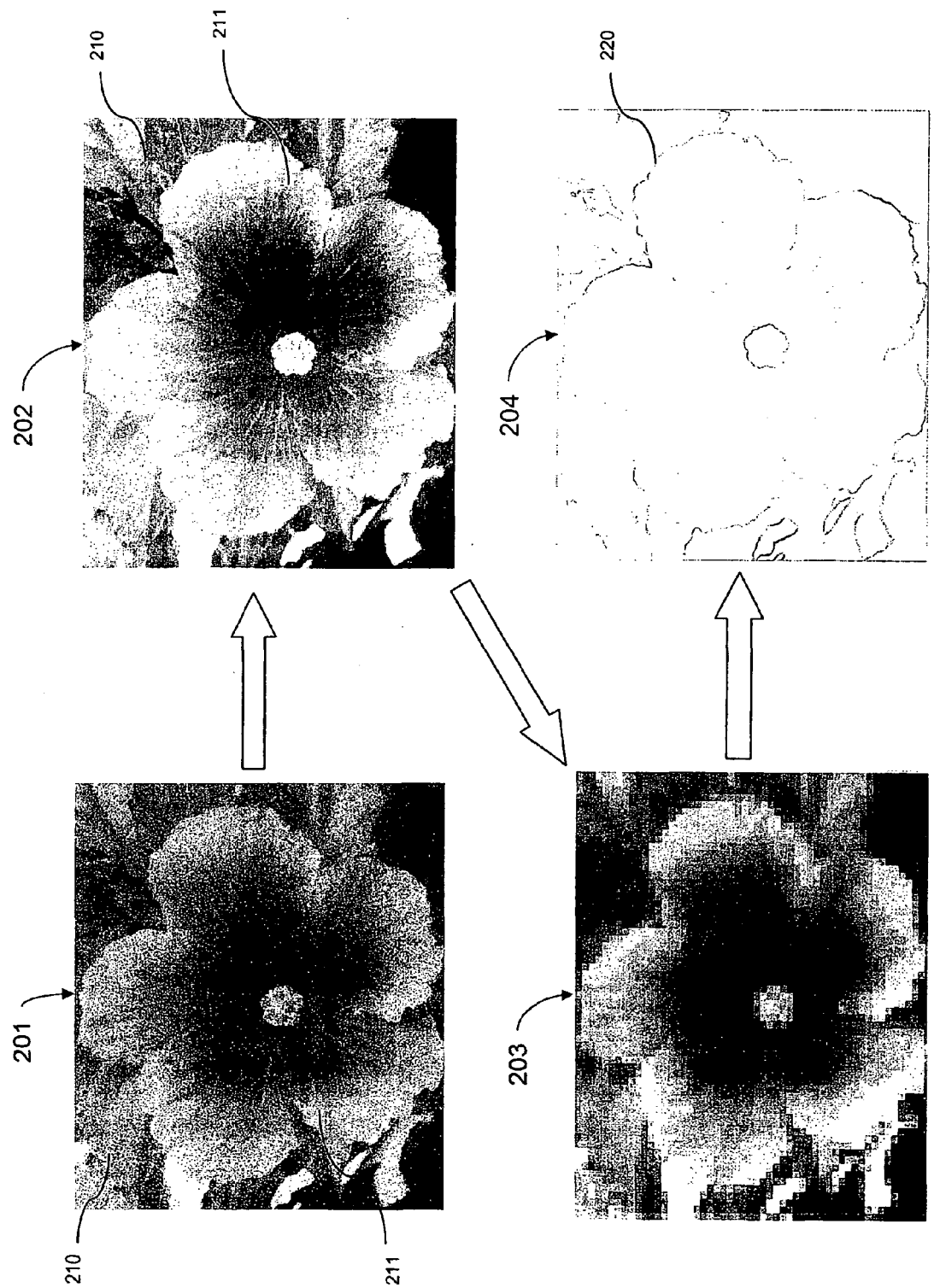
FIG. 2A depicts image outputs after applying various filters of image processing to differentiate an object within an image in accordance with the present invention.
Figure 2B:
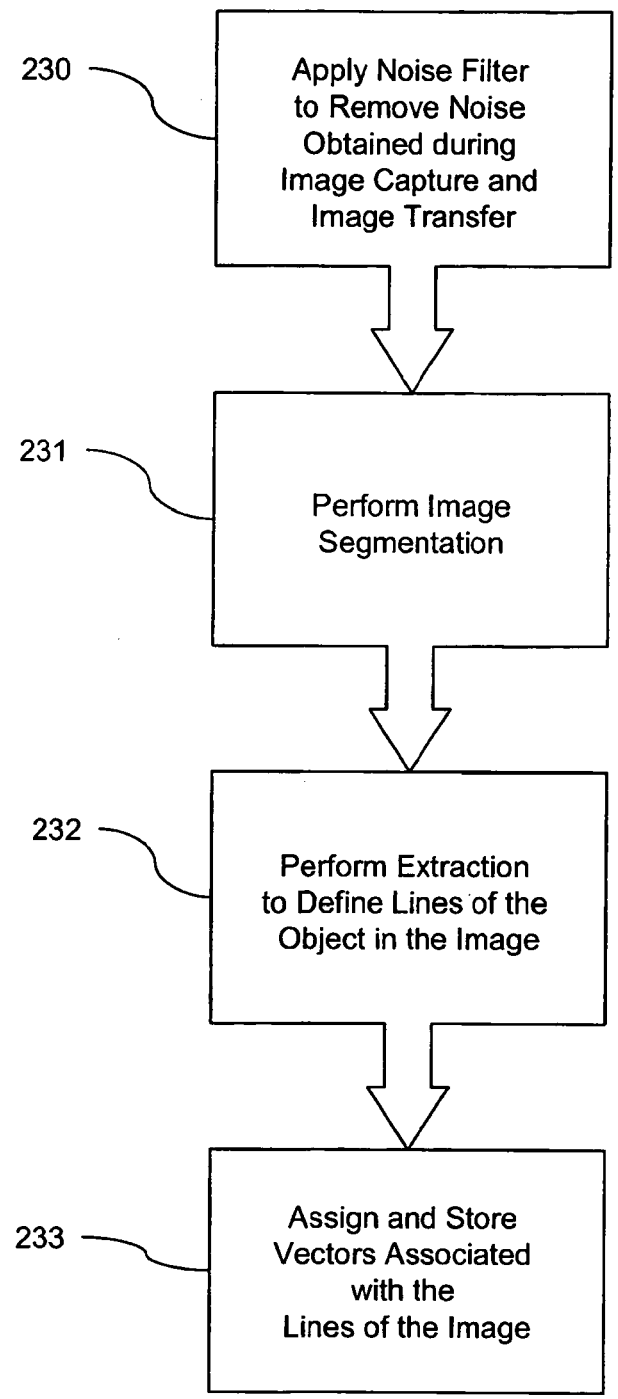
FIG. 2B depicts a flow diagram of the process steps applied to images of FIG. 2A.

The disclosed system utilizes image recognition technology to define an image and retrieve information about it from a large database. Many techniques can be used for image recognition as it has been an emerging field since the mid-1900s. The most widely-used approach for image recognition is object extraction, as shown in FIGS. 2A and 2B. Image 201 contains both a background 210 and object 211 located in the foreground. The first step to extract the object 211 is to remove as much "noise" from the image as possible as shown in process 230. Noise can take many forms such as vibrations from movement, particles in the air, or the like. When these disruptions occur, they create discrepancies within an image. Though slight and not apparent to the naked eye, the noise can cause difficulties when applying mathematical (algorithmic) properties to an image. For example, if a person were to attempt to trace an image that had a defined outline, the process would be easier than attempting to trace an image that had a fuzzy and discontinuous outline. Therefore, the more noise and less resolution an image has, the more difficult it will be to interpret it and match it to another image. Removal of noise is also known as noise filtering which can be seen in drastic proportions from image 201 to image 202.

Then the image 202 can be segmented in process 231 into contiguous regions where the result is seen on the segmented image 203. The next step in the imaging process is to filter image 203, or perform low-level extraction in process 232, in order to completely define object 211 from the background 210. Once extracted and enhanced the object's lines 220 are located in image 204. Following, vectors are assigned to the extracted lines and the image is stored in process 233 as a series of vectors (matrices) that are compressed and quantized to a finite amount, which often causes loss of data and, consequently, resolution, when and if the image is later viewed. It is contemplated that the order of image processing steps (e.g. noise filtering and segmentation), the number each step is performed, and the addition of further processing steps can vary with each application without departing from the spirit of the present invention.

After the object's lines 220 are defined, stored, and compressed, the mathematical representations are compared to other mathematical representations of images in a database.

These mathematical representations might differ slightly due to this loss of additional information during processing. Therefore, when compared in a database, the information returned to the user will most likely need to contain a plurality of best-fit matches. This process of feature extraction and comparison is called the Digital Elevation Model (DEM) for image registration.

In addition to the improvements being made to the current processes of pattern recognition, image recognition, and other types of computer vision, new methods are being developed to troubleshoot problematic areas of the pre-existing ones. For instance, there are manners of extracting image data by texture, color, neural networks, location, background objects, and the like. However, these areas still require improvement for reliability. Nevertheless, the present invention envisions future applications for potential use of these new technologies as the image-recognition process in this invention.

Figure 3:
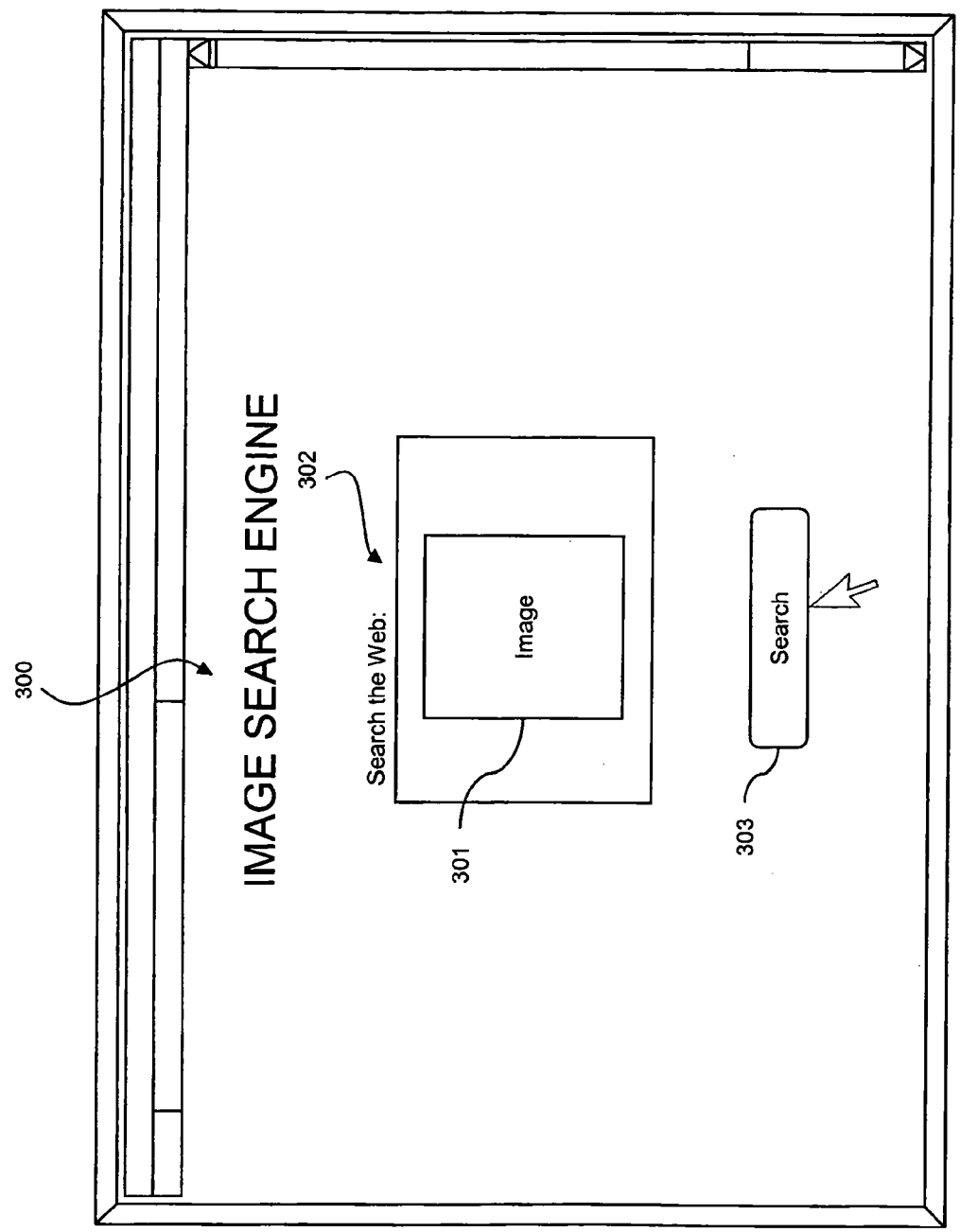
FIG. 3 depicts a screen shot of an exemplary interface of the search engine in accordance with the present invention.

The information associated with the images varies with different system applications. The source of information can comprise a single service provider site, combination or network of sites, or the entire universe of available information on the Internet. In a single site and a single application, each image or a group of images is linked to preset information. Essentially, each image or a group of images can have a webpage associated with it. For example, a user enters image 301 to search engine 300, shown in FIG. 3. The image can be entered into search field 302 in variety of possible ways, such as, but not limited to, cutting and pasting the image, uploading the image file, typing the path location to the search engine, and the like. As the user enters the image and initiates a search by pressing button 303, the system identifies the image and directs the CI device to the webpage associated with the image information. Additionally, these sites may require a subscription to the service and/or charge the user per each service usage. Since the CI device requires some communication subscription, the services can be charged to the existing communication subscription as well. For example, if a cellular telephone is used, the user may receive a charge on his or her cellular telephone service provider bill. However, the system might also be financially supported by sponsors' links.

If multiple sites of information are used, the images stored in the database can be indexed with text identifiers or the like, such as an image title, titles, or names of objects in the image. If the user enters image 301 to search engine 300 of FIG. 3, the captured image is matched with a stored image and associated with the indexed information about that stored image. This information then can be used to search the World Wide Web, USENET newsgroups, and other sources, to retrieve additional desired information about the image. As well, other restrictions can be enforced. For example, the system might allow only certain websites to be searched or might prevent some websites from being searched. As a result, desired privacy can be protected.

Figure 4:
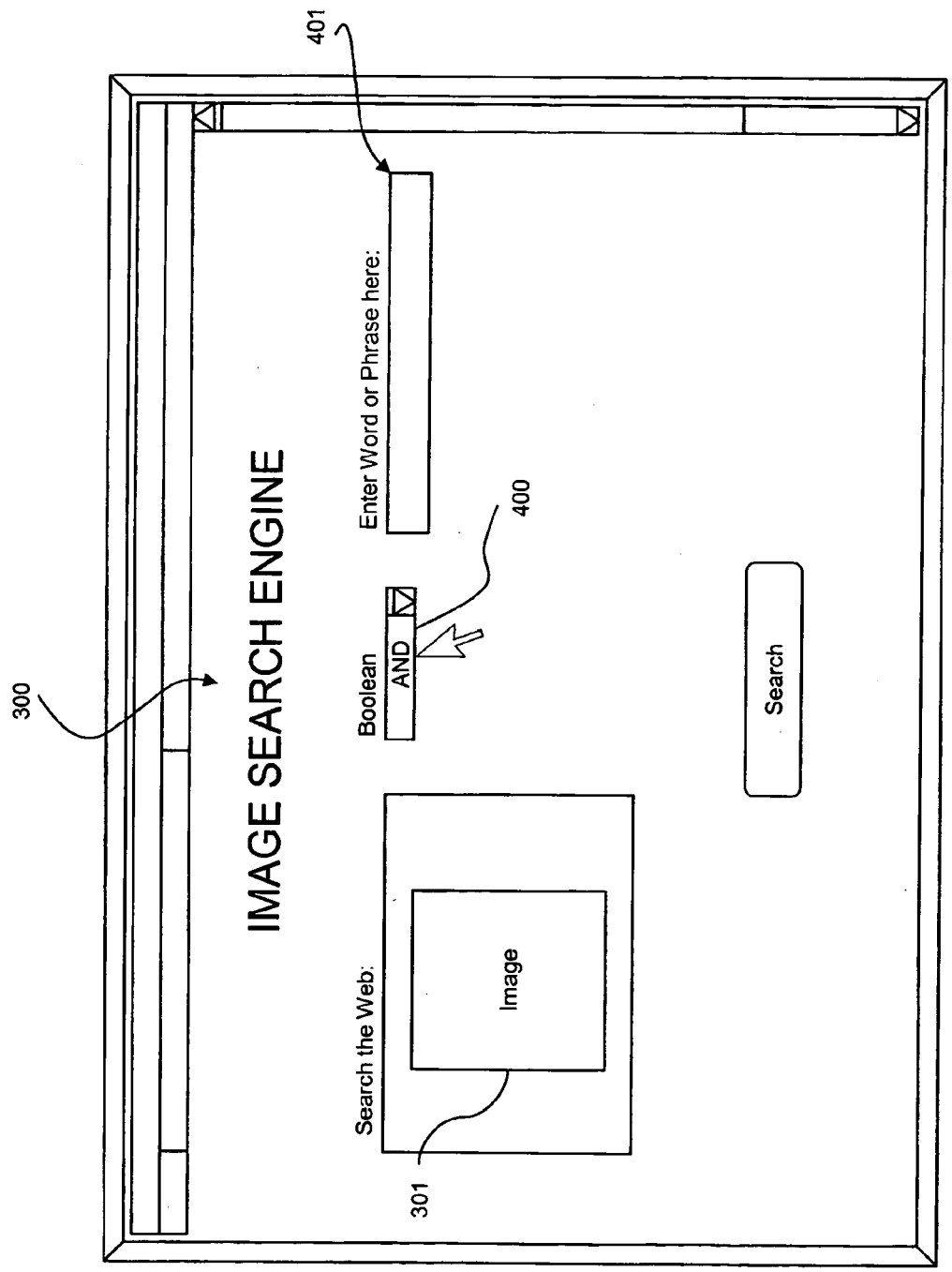
FIG. 4 depicts a screen shot of an exemplary interface of the search engine to search images in addition to a text query via Boolean parameters in accordance with the present invention.

When searching a large database, many matches can be found for a singular image, resulting in an excessive number of results. Consequently, the user could be presented with more source of information than he or she needs. To narrow the field of the search, the user can specify particular information she desires within the scope of system application through the use of Boolean expressions as illustrated in FIG. 4. The user enters image 301 into search engine 300, chooses to add a Boolean expression via pull down menu 400, and enters inquiry information into field 401, narrowing the field of the search. Boolean expressions, such as AND, OR, NOT, and the like, can be chosen from the pull down menu or typed into the search engine manually. Inquiry information inputted into field 401 can be anything associated with the image, anything the user wishes to discover about the image or anything the user wishes to know about in conjunction with the image. The system can identify captured image 301, extract information associated with the image, and further perform a search utilizing the information associated with the inquiry information from field 401. In an alternative method to narrow the search, the system can first search for images associated with inquiry information from field 401 then use the found group of images and match them to the captured image 301, and extract the information regarding the image. Additionally, the search engine 300 could function such as disregarding the Boolean inputting field 400 and using a default Boolean parameter to search the database. In such case, it is preferred and common in practice to use the AND parameter.

Also, the utilization of OCR technology to achieve a more automated system is possible. The system can transform images with embedded text into key words and enter those key words as search terms for the search engine, further shaping the extent and nature of the search. Alternatively, a series of alphanumeric characters, such as key words, is generated and entered by a user to further clarify and narrow the search. For example, a traveler can take a photo of the window of a restaurant, capturing parts of a menu, parts of the window display, or the name of the restaurant. When the photo is entered into a search engine, it returns information pertaining to reviews, décor, value, history, or the like.

Figure 5:
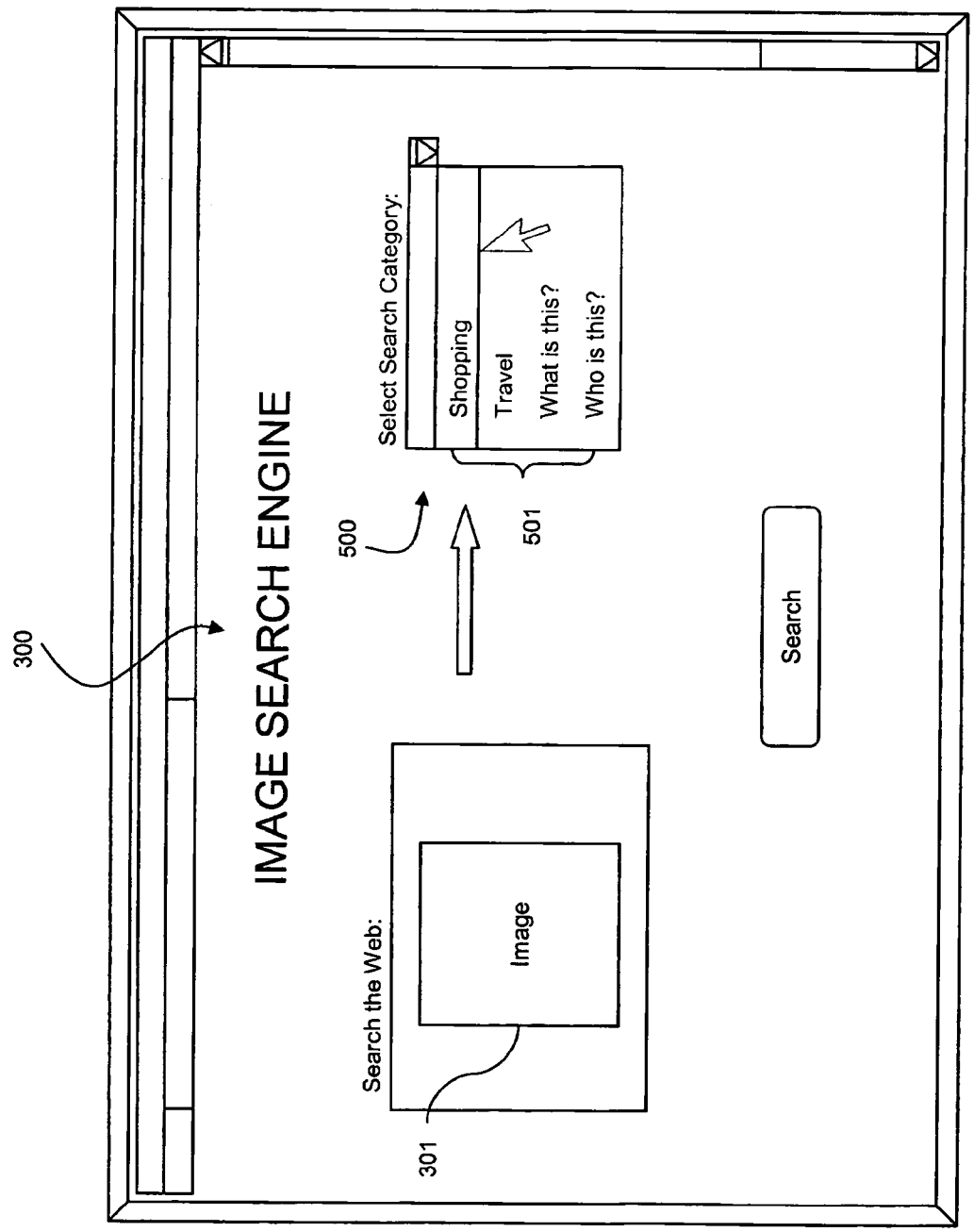
FIG. 5 depicts a screen shot of an exemplary interface of the search engine to search images via an search categories in accordance with the present invention.

When applying the system to multiple applications, the database search can be arranged into categories as shown in FIG. 5. The user enters image 301 into search engine 300, and specifies the type of image captured or the type of information she desires to extract by choosing from category list 501. For example, different types of searches can be performed based on what the user wants to know. For example, if the image is of a building and the building is historic, and historical information is desired, the search can be limited to historic sites. If the building is a restaurant and the user desires information about it, the search may be limited to commercial dining sites. These sites might provide restaurant hours, proper attire, type of food, or a view of the entire food menu. The CI device is programmed to provide the user with a menu 500 in which available categories are chosen from category list 501. In another embodiment, the user also may key or type a category of inquiry, or enter it by means of VRT.

Figure 6:
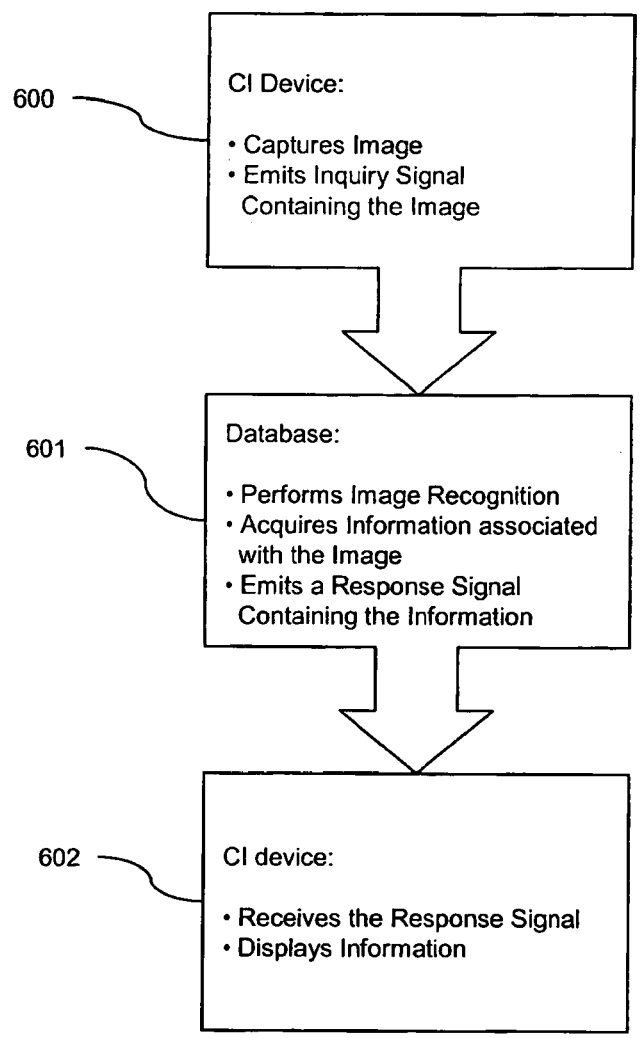
FIG. 6 depicts a flow diagram illustrating a process wherein an image is captured and processed in order to extract information about the image in accordance with the present invention.

A system of the present invention might comprise a CI device connected to a network where the process of operation is shown in FIG. 6. The CI device captures an image and emits an inquiry signal containing the image in process 600. The database receives the inquiry signal through a network, performs image recognition, acquires information associated with the image, and emits a response signal containing the acquired information in process 601. Finally, the CI device receives the response signal containing the information and displays the information as shown in process 602.

Figure 7:
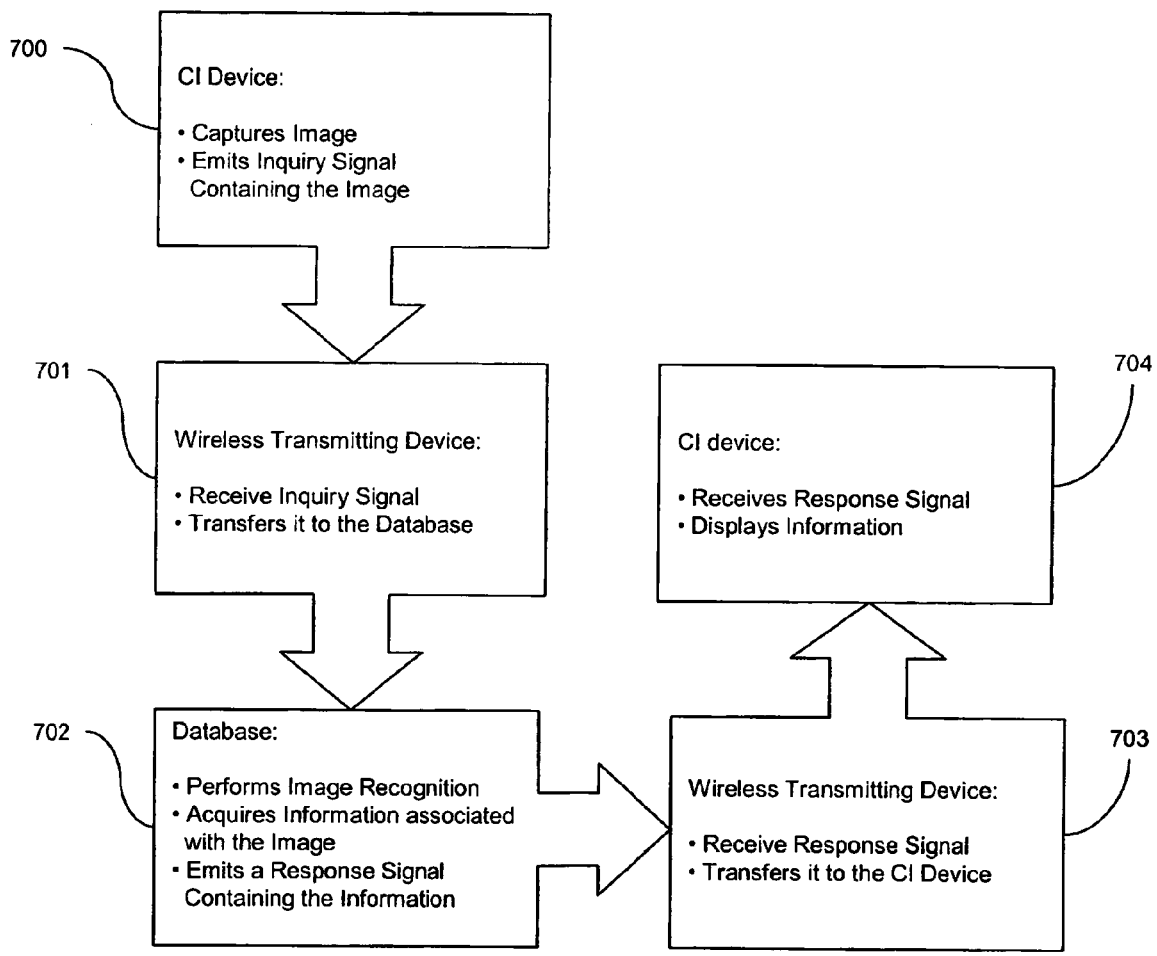
FIG. 7 depicts a flow diagram illustrating a process wherein a wireless transmitting device is utilized to transmit information between the communication device and the database in accordance with the present invention.

If the CI device is wireless, a wireless transmitting device, such as a remote tower, is used to transfer the information from the CI device to a network, the process of its operation is shown in FIG. 7. The CI device captures the image and emits an inquiry signal as shown in process 700. The wireless transmitting device then receives the signal and transfers it to a database through a network in process 701. The database then performs image recognition, acquires information associated with the image, and sends the information back to the wireless transmitting device in process 702 to be transferred back to the CI device in process 703. The CI device receives the information and displays it for the user on any number of wireless CI devices such as hand-held devices, cellular telephones, PDA's, laptop computers, or the like.

Figure 8:
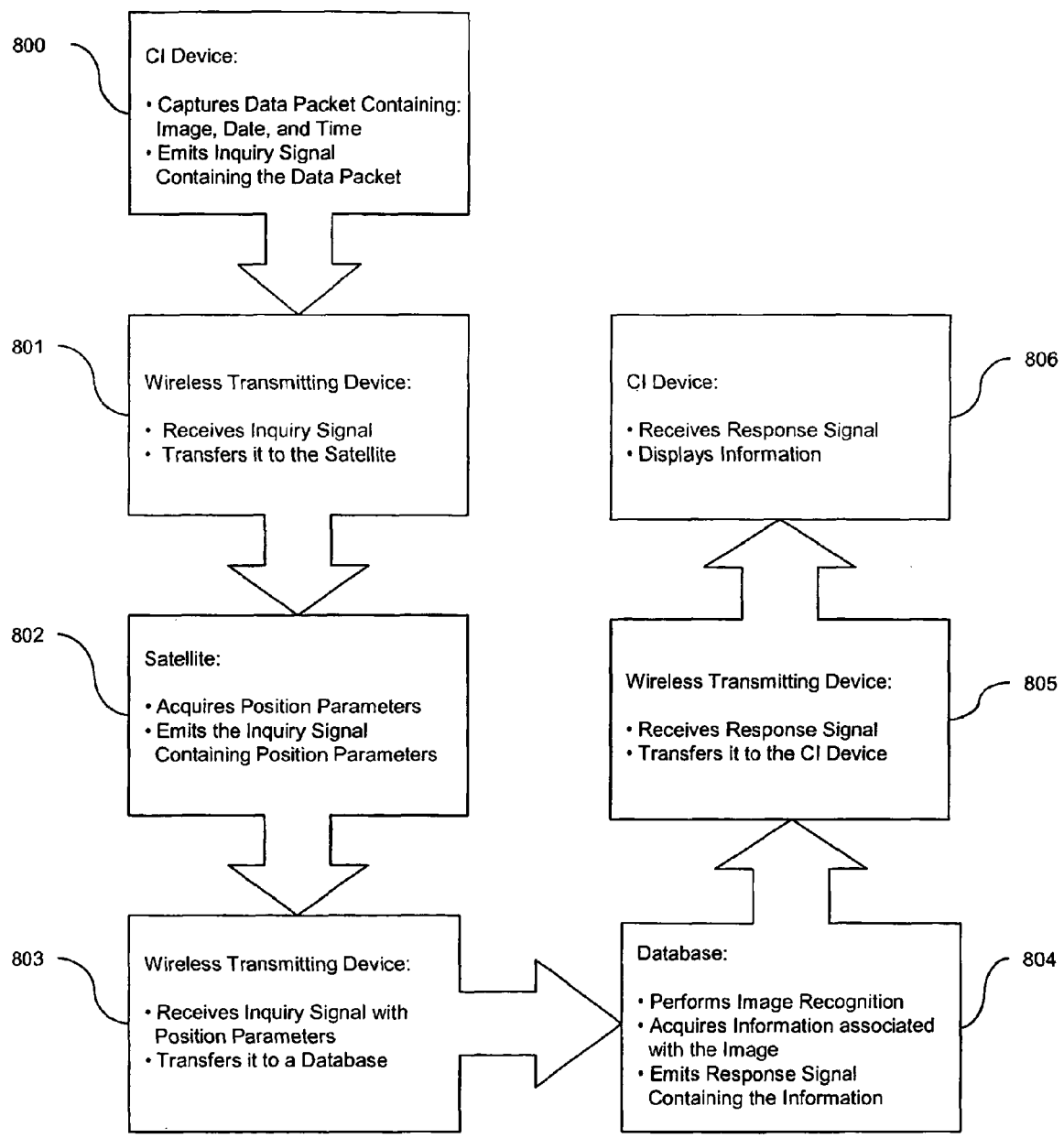
FIG. 8 depicts a flow diagram illustrating a process wherein additional constricting parameters such as GPS, date, and time can be used to further narrow and expedite the search in accordance with the present invention.

FIG. 8 shows a process of operation where a GPS-equipped CI device can additionally record the date and time of image capture. The CI device first captures an image, then records the time and date of image capture, and finally emits an inquiry signal with a data-packet containing the acquired information in process 800. A wireless transmitting device receives the inquiry signal and transfers it to GPS satellite in process 801. When a satellite receives the signal, the CI device coordinates are calculated and indexed into the data-packet as shown in process 802. The wireless transmitting device receives the indexed data packet and transfers it to the database for analysis in process 803. The processing means associated with the database performs image recognition functions and acquires information associated with the image and any additional information provided in process 804. The CI device receives the information through wireless transmitting device in process 805 and displays it on display screen in process 806 or an associated display unit.

The present invention has an important applicability in the commercial sphere. The ability to capture a product image or an image related to a product, acquire information about it, and purchase it by means of the CI device is desirable. The CI device might capture an image of a product in a store or of a product of interest in the possession of another party. Alternatively, the user can capture a product image from another image, such as a pamphlet, TV commercial, monitor of a computer, screen of a hand-held device, magazine, newspaper, product label, poster, or the like. Furthermore, the system enables a user to capture an image of any person, place, or thing, to receive information about the object, and to take a subsequent action such as making a purchase, leasing a product, arranging financing, or arranging delivery or pick-up of the product.

When capturing an image of product labels, various printed indicators can be useful for fast and accurate image recognition. Barcodes, serial numbers, model numbers, or any other identifying parameter can help to identify the product, since they are unique. Examples of commercial applications include, but are not limited to, real estate, retail stores, entertainment, and other such venues.

Figure 9:
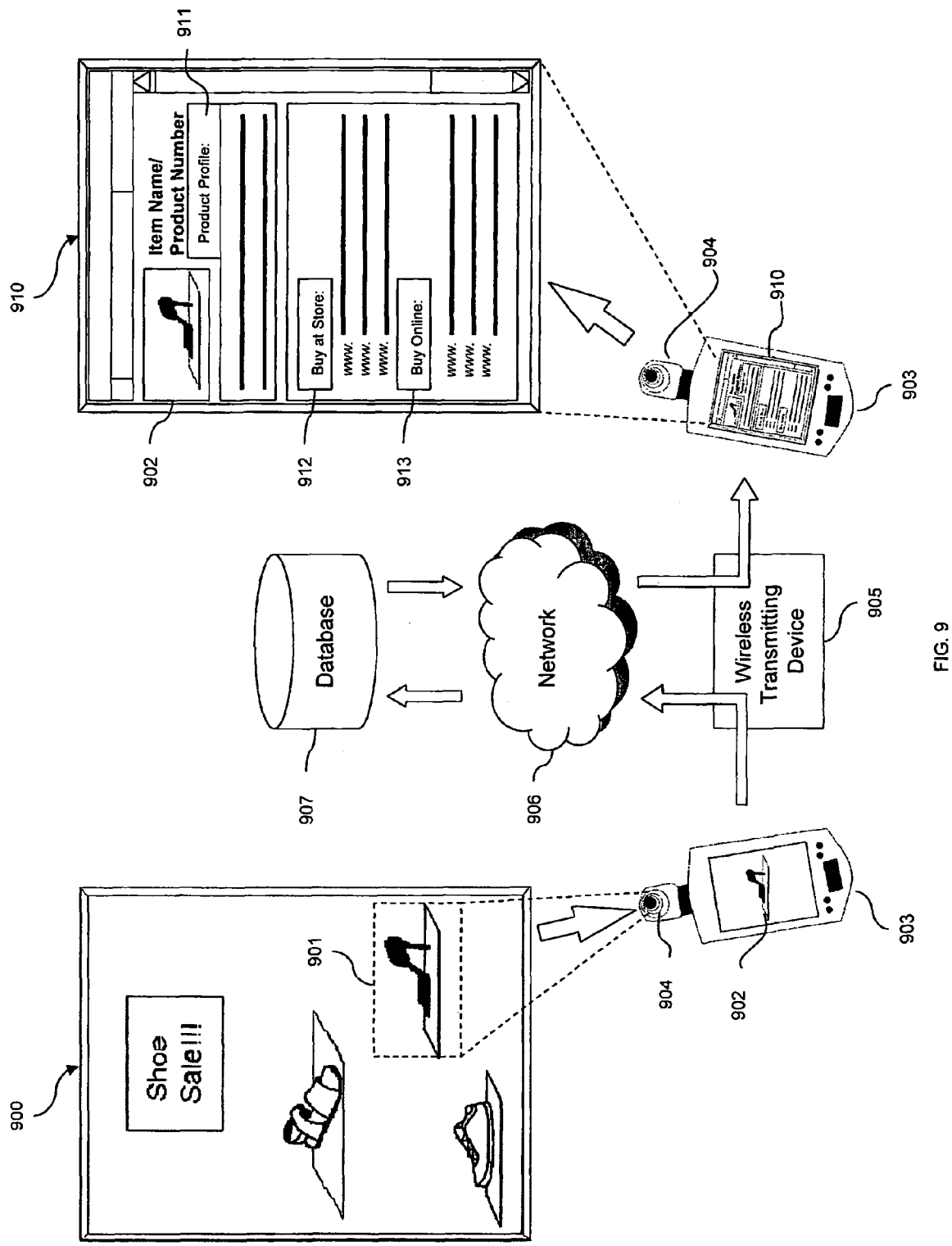
FIG. 9 depicts a practical use of the system of the present invention in the commercial context, wherein a user utilizes a camera enabled PDA to capture an image of a product and acquire purchasing information via the method of the present invention.

FIG. 9 shows an embodiment of the invention to acquire information about product 901 on display in store window 900. The user operates hand-held CI device 903, such as a hybrid PDA/cellular telephone with camera attachment 904, in order to capture image 902 of product 901. CI device 903 emits an inquiry signal to be received by wireless transmitting device 905 and transferred to network 906 that contains a database. Database 907 receives image 902, performs image recognition, and accesses electronic information associated with that image. CI device 903 receives the information that was accessed and displays it.

The user of the system may be interested in the product, but not have the inclination to review the information about it as soon as it is retrieved due to time, money, and/or availability constraints. To accommodate for this, the system allows the user to capture an image of the product and store it for later use. Additionally, one might capture a desired product with an unwanted detail, such as color, size, or the like, and use the system to identify the product. Upon identification of the product, the user can then access additional information about availability of variations of the product and locations to purchase it.

The product information associated with product 901 might consist of, but is not limited to, product description 911, pricing, store locations and availability, online purchase capabilities, purchase statistics, information about related products, and the like. Additionally, the information might consist of links to a plurality of retail store sites 912, product manufacturers, online stores 913, online auction sites, and the like. After reviewing the product information, the user is able to purchase the product using the acquired information. Alternatively, after capturing an image and instead of acquiring product information, the CI device is directed to an order placement site wherein the user can readily place an order.

Preferably, each user of the system has a personal profile such that the system can acquire information according to the user's criteria. The profile might consist of price limits, residency, taste, sizes, and the like. In another embodiment, providing the system with the residence or workplaces of a user allows the search engine to extract proximate store locations. Moreover, the user might enter a current location, or the system might have positioning capabilities such as GPS to find proximate locations to the user at the time of image capture. Also, information stored such as clothing sizes, either in the CI device or in a remote database, enables the system to extract only the locations having the correct items in stock.

The personal profile might also include the user's asset information, facilitating payments and/or refunds. There has been recent speculation that cellular telephones will assume functionality of credit cards, identification means, access means, and the like. This functionality certainly is adaptable to the presently disclosed system.

Advertising is another commercial application of the present invention. For example, a user captures an image of an advertisement in a magazine, on a poster, or on the screen of a television, transmits the advertising image to a database, and acquires additional information about the product, commodity, or service. The user may also be linked to the source site of the advertisement. Advertisements might be captured from pamphlets, flyers, newspapers, books, posters, magazines, newspapers, TV commercials, coupons, or the like. Alternatively, information about services involving matters of health, law, travel, insurance, and the like also may be acquired. For example, a person can "shoot" a movie poster or marquee to obtain reviews of a movie, times and places of showing, cost of tickets, information about the director and actors, and information about other movies that might appeal to the user. The user of the system can also purchase tickets.

Figure 10:
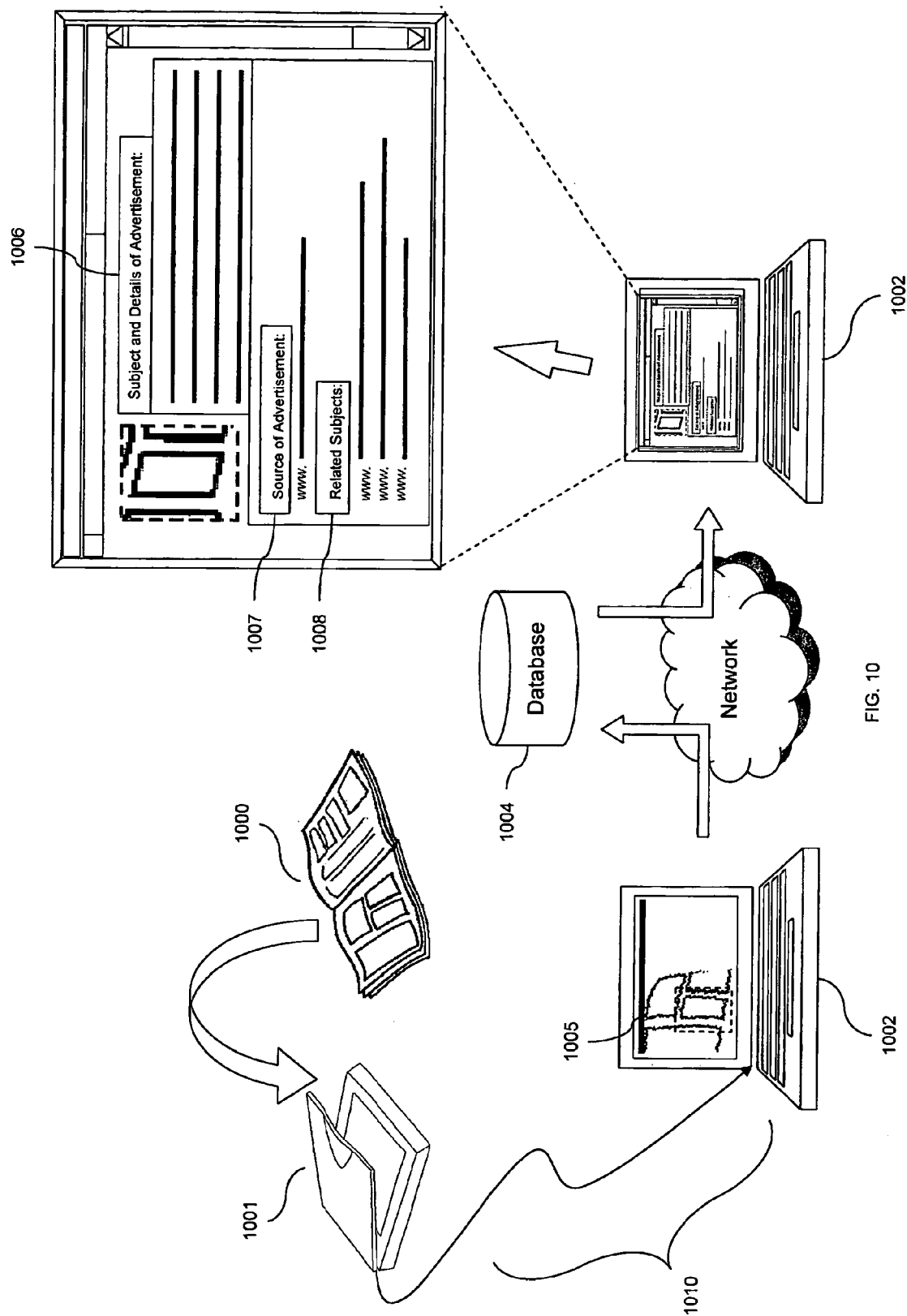
FIG. 10 depicts a practical use of the system of the present invention in the advertisement context, wherein a user utilizes a scanning device and a computer to scan an advertisement from a magazine and access further information about the subject of the advertisement via a search of the advertisement image or images using the method of the present invention.

FIG. 10 shows an example of the aforementioned application. An advertisement in magazine 1000 is scanned into computer 1002 through scanner 1001, wherein scanner 1001 and computer 1002 comprise elements of a CI device 1010. The user highlights the particular advertisement 1005 of the magazine page for which additional information is desired. Computer 1002 sends the image to database 1004, where the image is processed and compared with images stored in the database. The system extracts information 1006 about advertisement 1005, such as a more detailed description. The system can also provide a link to the source site of information 1007 or directly take the user to the source site as the advertisement is entered into the search engine. This aids the user in finding contact or pricing information to purchase services or products. The system also offers a listing of related sites 1008 where the user might access similar categorized services.

Figure 11:
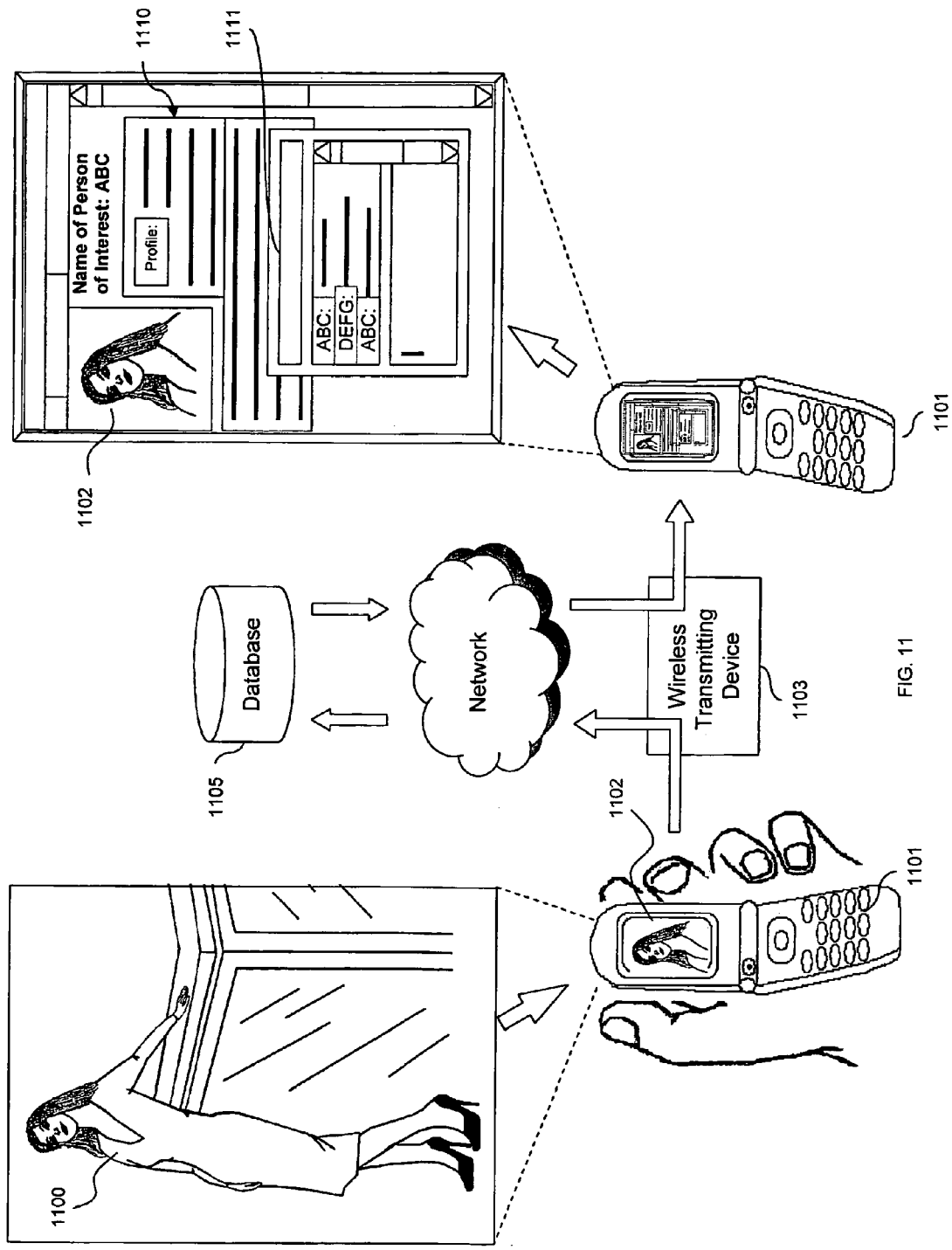
FIG. 11 depicts a use of the system of the present invention in the communication context for purpose of facilitating personal contact to one or plurality of personal parties, wherein a user uses a camera enabled phone to capture an image of a person and obtain information about that person of interest via the method of the present invention.

FIG. 11 provides an example of another application of the present invention involving communication with or acquisition of information about persons of interest to the user. Upon observing person of interest 1100, the user of the system uses CI device 1101, such as a cellular telephone having a camera, to acquire information about person of interest 1100 by capturing their image 1102. CI device 1101 sends the image to database 1105 by means of wireless transmitting device 1103 for processing of that image. The processing means associated with database 1105 performs facial recognition or some other form of biometric recognition, identifies the individual, and extracts information regarding the individual from the database 1105. The user of the system can then view the information on the display screen of CI device 1101.

Database 1105 contains images linked to information regarding the individual in the image. Upon extracting information, the system sends a web link to CI device 1101, or it downloads the information onto CI device 1101. The individual's information can be as extensive as the individual chooses, depending on system applications such as personal interests, professional interest, medical history, criminal history, commercial preferences, or other similar information. The information can be entered in profile form 1110 by the person of interest and can consist of the individual's name, screen name, description, text information, visual features, personal traits, demographic characteristics, additional photographs, audio clips, video clips, or the like. However, due to security and/or privacy issues, after the user captures an image and desires to extract further information about the person of interest, the system notifies the person of interest or requests permission to allow the user of the system to access the person-of-interest's data. Additionally, the person of interest might first request information from the user, such as photographs, marital status, educational background, professional status, level of income, ethnicity, political beliefs, and the like, before sending or permitting the access of any personal information. As well, any person may choose not to publicly post information to ensure his or her privacy. In this case, the user of the system is unable to extract any information.

On the other hand, if the person of interest seeks to find people with common interests, his or her profile 1110 may contain contact information that enables the inquiring user of the system to establish contact. The contact information can be a phone number, an address, an e-mail address, an instant messenger screen name, or an anonymous contact capability. For example, if a instant messenger screen name is available, the user uses CI device 1101 to send instant message 1111 to person of interest 1100 through the Internet, and person of interest 1100 decides whether or not to respond. For security purposes, the system may request that the user first transmit his or her profile to the person of interest, providing a basis for the person of interest to decide whether or not to maintain or expand contact. The user of the system may also use CI device 1101 to capture an image of multiple individuals in a facility. The system may provide the user with a selective choosing device, such as a scroll button, a mouse, or a numbering system, to select persons of interest and to acquire their information.

The system need not be used only in the Internet context. Various organizations can use the system to identify people or acquire important information. The database could be maintained by the organizations and contain data such as the image representation of an individual and their desired descriptions. In the medical field instance the database can be maintained by medical facilities and entered by medical personals as the individuals' medical records change. For example, individuals having a chronic illness may contain information identifying their illness and ways of assisting such an individual. In the instance that they have a recurrence, anyone authorized to access the system, such as medical personnel, may capture their image and acquire password protected medical information about the affected person through available wireless Internet based device. This would provide a more secure environment for the sickly, elderly, or the like.

The system can also be used in a secure environment such as, but not limited to a prison, airport, secret agencies, army, hospital, and the like. In these applications, the individual's information includes criminal, immigration, medical records, or the like. Anyone that has access to the system can enter the information about the person of interest into the system. The authorized person can access this personal information via a password or the like. The information can be used to run background checks, to identify individuals in need of help, to find missing individuals, or the like.

The system can be used as a child-loss-prevention system wherein parents or school officials may enter the child's photograph along with identifying information. The identifying information may include the child's name, names and contact information of parents or school officials, and/or the address of the family's residence. For instance, if a user of the system finds a lost child, that user can use the CI device to capture a photograph of the child and acquire the identifying information regarding the child.

Figure 12:
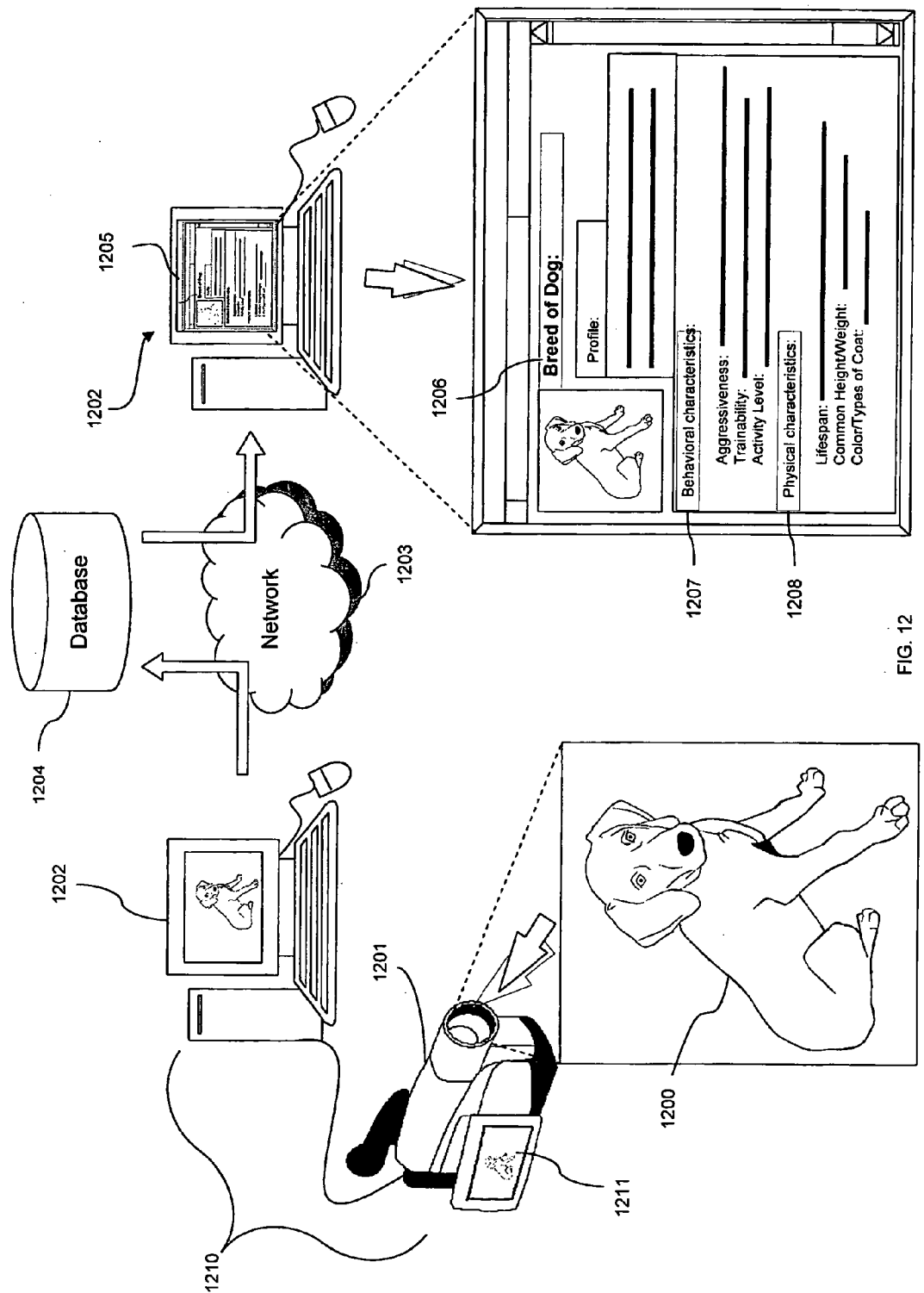
FIG. 12 depicts a use of the system of the present invention in the education context, wherein a user uses a video camera and a computer in order to acquire educational information about an object depicted in a captured video via the method of the present invention.

The present invention also has great potential for the field of education. The present invention provides a system and method for accessing information regarding an object of question. The source of information retrieved can be books, dictionaries, encyclopedias, articles, news, or the like. FIG. 12 illustrates a means for accessing educational information in which a user of the system captures an image of puppy 1200 and enters it into computer 1202 through the computer's connection with video camera 1201 that is associated with a CI device 1210. The image is entered into search engine 1204 through network 1203 and is processed in order for best-fit matches to be found in database 1204. A listing of possibilities may then be transmitted back to the CI device 1210 and displayed on display unit 1205 or 1211 associated with the CI device 1210.

The present invention has further educational potential. For example, the user can capture images of exhibited art or artifacts and enter the images into the image search engine to acquire historic or other information.

An example of a virtual travel guide is shown in FIG. 13. It utilizes GPS and an Internet-accessible digital camera 1300 as the CI device. The CI device captures image 1301 of building 1302 and acquires information. The CI device 1300 can also acquire the time and the date of the image captured, and GPS information from satellite 1304 through wireless transmitting device 1303 and transfer the captured information to database 1306 through network 1305 as a data packet. The GPS coordinates are used as a search constraint to refine the search. When populating such a database, it is desirable to associate different scenarios with images as well as location coordinates. When a data packet received by database 1306 contains both images and coordinates, the database first searches for the closest matching coordinates until a specific range is reached. The captured image is then checked against stored images whose coordinates fall within the specified range. As a result GPS narrows the search and thereby expedites the extraction of useful information.

The acquired information is displayed on display screen 1314 of CI device 1300. If captured image 1301 is of a historic building, the information can include the name of the building and a historic profile 1310, including the building's dimensions, the building establishment date, the past usage of the building, and the like. The user of the system enters an inquiry date into the CI device in order to extract information associated with the image on that particular date or thereabouts. The information is extracted from a preset timeline of events, or is used as a search entity to search the Internet. Additionally, date and time 1311 of the captured image is used to extract information associated with that time and the date. For example, the time and date might be associated with information as to whether or not the building is open to visitors. The current time and date coned to be used to extract current news involving building 1312. The database also might search the Internet for available new information posted on that specific time and date and display sites 1313 on the CI device.

Additionally, the system may be used as a translation or dictionary guide to translate signs or written documents. For example, the system captures an image of a street sign in a language foreign to the user and further uses GPS coordinates for assistance to determine the country in which the image is captured. The system further performs image processing to identify the written characters and input the written or printed word or phrase into an electronic translator.

What is claimed is:

1. A computer-implemented method for accessing electronic data of a person of interest, comprising:
    storing information regarding a plurality of images and information regarding a plurality of people in a database, wherein at least one image is associated with each person of the plurality of people;
    receiving, with a receiver, information regarding an image of the person of interest, wherein the image is obtained with an image capture device and further wherein the image capture device automatically transmits the information regarding the image to the receiver;
    comparing the information regarding the image to the information regarding the plurality of images;
    determining whether the image matches an image of a person of the plurality of people and, if the image matches an image of a person of the plurality of people, generating a message;
    transmitting the message to a communication device of or associated with a user, wherein the message contains a first request that queries the user for an authorization to provide access to information regarding the person of interest to the user;
    receiving, with the receiver, a response to the message from the communication device of or associated with the user, the response to the message containing the authorization to access information regarding the person of interest;
    transmitting information regarding the person of interest to the communication device of or associated with the user if the user is authorized to access the information;
    transmitting a second request to the communication device of or associated with the user for an additional information regarding the person of interest; and
    receiving, with the receiver, the additional information from the communication device of or associated with the user regarding the person of interest.

2. The method of claim 1, wherein the person of interest has a criminal record.

3. The method of claim 1, further comprising:
    obtaining the image from a visual entity, a printed material, an electronic display unit, or a projected visual information.

4. The method of claim 1, wherein the image capture device is a camera or contains a camera.

5. The method of claim 1, wherein the image capture device is a scanner or contains a scanner.

6. The method of claim 1, wherein the image capture device is a Communicable-Imaging device or contains a Communicable-Imaging device.

7. The method of claim 6, wherein the image capture device further comprises a display unit.

8. The method of claim 6, further comprising:
    processing information, via the image capture device, for performing image recognition pertaining to the information regarding the image.

9. The method of claim 1, further comprising:
    processing information, via a processor, for performing image recognition pertaining to the information regarding the person of interest.

10. The method of claim 1, further comprising:
    providing information regarding each of the plurality of images via an internet web page.

11. The method of claim 1, further comprising:
    linking information regarding each image of the plurality of images with information regarding a person of the plurality of people.

12. The method of claim 1, wherein information regarding each image regarding the plurality of images contains information regarding an alphanumeric identifier, a description, a name, or a title.

13. The method of claim 1, further comprising:
    accessing the electronic data through a network.

14. The method of claim 1, wherein the authorization to access information regarding the person of interest comprises a password.

15. The method of claim 1, wherein the information regarding the person of interest comprises a criminal record.

* * * * *